United States Patent [19]
Gardner

[11] Patent Number: 5,358,799
[45] Date of Patent: Oct. 25, 1994

[54] FUEL CELL

[75] Inventor: Frederick J. Gardner, Derby, England

[73] Assignee: Rolls-Royce and Associates Limited, London, England

[21] Appl. No.: 82,467

[22] Filed: Jun. 28, 1993

[30] Foreign Application Priority Data

Jul. 1, 1992 [GB] United Kingdom ............... 9213964.1

[51] Int. Cl.$^5$ ............................................. H01M 8/04
[52] U.S. Cl. ....................................... 429/26; 429/33; 165/104.26
[58] Field of Search ................. 429/26, 33; 165/104.26

[56] References Cited

U.S. PATENT DOCUMENTS

| | | | |
|---|---|---|---|
| 3,525,386 | 8/1970 | Grover | 429/26 |
| 3,568,762 | 3/1971 | Harbaugh | 165/104.26 |
| 3,682,239 | 8/1972 | Abu-Romia | 165/104.26 X |
| 3,865,630 | 2/1975 | Reimers | 429/26 |
| 4,826,742 | 5/1989 | Reiser | 429/33 |
| 4,973,530 | 11/1990 | Vanderborgh et al. | 429/26 X |

FOREIGN PATENT DOCUMENTS 1354911 11/1985 U.S.S.R. ........................ 165/104.26

Primary Examiner—Stephen Kalafut
Attorney, Agent, or Firm—Cushman, Darby & Cushman

[57] ABSTRACT

A fuel cell uses hydrogen as a fuel and oxygen as an oxidant and a hollow member is partially located in an anode chamber, partially located in a cathode chamber and partially located in a water collecting chamber. The hollow member contains a non electrolyte aqueous solution, eg sucrose solution. The hollow member is formed from a semi-permeable membrane which allows water to permeate therethrough but prevents hydrogen, oxygen and the solute, eg sucrose permeating therethrough. Water transported through a solid polymer electrolyte from the anode chamber to the cathode chamber and water produced in the cathode chamber permeates through the semi-permeable membrane into the hollow member by osmosis. Water in the hollow member permeates through the semi-permeable membrane into the anode chamber and dryer regions of the cathode chamber by osmosis. Water in the hollow member permeates through the semi-permeable membrane into the water collecting chamber.

22 Claims, 3 Drawing Sheets

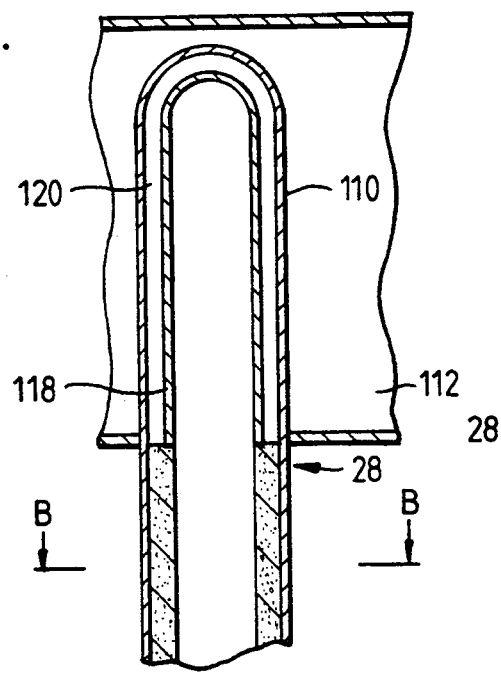
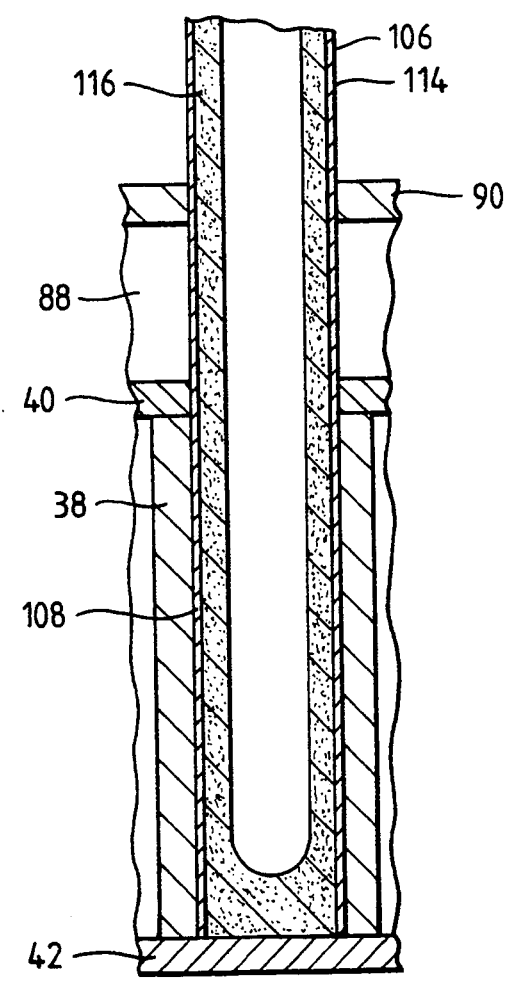
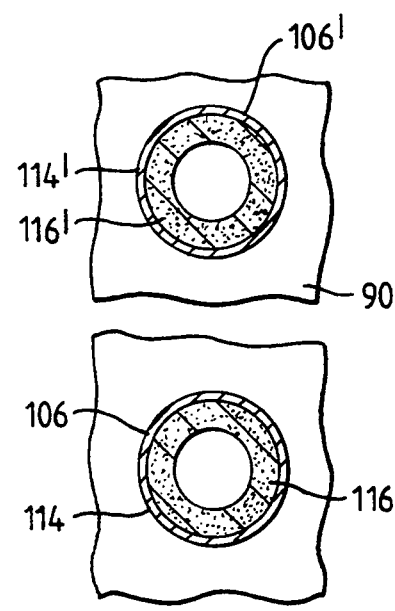

FUEL CELL

FIELD OF THE INVENTION

The present invention relates to fuel cells, and is particularly concerned with water management systems for fuel cells, and heat management systems for fuel cells.

BACKGROUND OF THE INVENTION

In fuel cells a fuel gas and an oxidant gas are used to produce an electrical current. The fuel gas is supplied to an anode chamber in which is located an anode electrode, and the oxidant gas is supplied to a cathode chamber in which is located a cathode electrode. An electrolyte is located between the anode and cathode electrodes. The fuel gas is oxidised at the anode to produce ions and free electrons. The free electrons are supplied to one terminal of the fuel cell, and the other terminal supplies free electrons to the cathode to reduce the oxidant gas. The ions pass through the electrolyte to react with the oxidant.

In one known type of fuel cell hydrogen is used as the fuel gas and oxygen is used as the oxidant gas. This type of fuel cell comprises an anode chamber in which is located an anode electrode, a cathode chamber in which is located a cathode electrode and an electrolyte which is located between the anode and cathode electrode. Hydrogen is supplied to the anode chamber and oxygen is supplied to the cathode chamber. The electrolyte is typically a solid polymer electrolyte.

In operation water is transported from the anode electrode to the cathode electrode through the solid polymer electrolyte by the action of positive ions passing through the solid polymer electrolyte from the anode electrode to the cathode electrode. Also water is produced by the reaction of the positive hydrogen ion with the oxygen at the cathode electrode. Thus water may collect on the surface of the cathode electrode and prevent the oxygen contacting the cathode electrode and the anode electrode may become dry due to the transportation of water from the anode to the cathode, this leads to a reduction in the operating efficiency of the fuel cell. Heat is also generated when the hydrogen ions combine with the oxygen to produce water.

Therefore there is a requirement for a fuel cell which has a water management system which will prevent, or reduce the amount of, water collecting on the surface of the cathode electrode and prevent the surface of the anode electrode becoming dry. There is also a requirement for a fuel cell which has a heat management system which will dissipate heat from the fuel cell.

SUMMARY OF THE INVENTION

Accordingly the present invention seeks to provide a novel fuel cell which reduces, or overcomes, the above mentioned problems.

Accordingly the present invention provides a fuel cell comprising an anode chamber, a cathode chamber, means to supply a fuel gas to the anode chamber, means to supply an oxidant gas to the cathode chamber, the anode chamber having an anode electrode, the cathode chamber having a cathode electrode, an electrolyte located between the anode electrode and the cathode electrode, and a hollow member positioned partially in the anode chamber and partially in the cathode chamber, the hollow member containing a non electrolyte aqueous solution, the walls of the hollow member being formed from a semi-permeable membrane which allows water to permeate therethrough but which prevents the permeation of the solute of the non-electrolyte aqueous solution, the fuel gas or the oxidant gas therethrough, whereby, in operation, water produced or collected in the cathode chamber permeates through the wall of the hollow member into the hollow member by osmosis such that water in the hollow member permeates through the wall of the hollow member into the anode chamber by osmosis.

Preferably a portion of the hollow member is positioned within a third chamber, the pressure of water in the hollow member being greater than the pressure of water in the third chamber whereby, in operation, water in the hollow member permeates through the walls of the hollow member into the third chamber.

The hollow member may comprise a first limb, a second limb and an interconnecting member which fluidly connects the first and second limbs, the first limb is positioned at least partially in the anode chamber, the second limb is positioned at least partially in the cathode chamber, and the interconnecting member is positioned in the third chamber.

Preferably the electrolyte is a solid polymer electrolyte.

Preferably the wall of the second limb of the hollow member is enclosed by a capillary wick, the capillary wick being arranged in contact with the cathode electrode.

The wall of the first limb of the hollow member may be enclosed by a capillary wick, the capillary wick being arranged in contact with the anode electrode.

The capillary wick may comprise porous graphite.

The third chamber may be arranged to supply water produced in the second cathode chamber to a water store.

The non-electrolyte aqueous liquid may be water or a water-sucrose solution.

The means to supply a fuel gas may be arranged to supply hydrogen. The means to supply an oxidant gas may be arranged to supply oxygen.

A heat pipe may be arranged to contact at least one of the fuel cells to cool the fuel cell, the heat pipe having an evaporator region and a condenser region, the heat pipe comprising a hollow member, the hollow member having a wick and a semi-permeable membrane, the wick being arranged within the hollow member and being arranged to contact the inner surface of the hollow member, the wick being located within the evaporator region of the heat pipe and extending continuously along the inner surface of the hollow member from the evaporator region up to but excluding the condenser region of the heat pipe, the semi-permeable membrane being arranged within the hollow member and being spaced from the inner surface of the hollow member, the semi-permeable membrane being located within the condenser region of the heat pipe and being secured to the wick, the wick and the semi-permeable membrane defining a chamber with the inner surface of the hollow member, a non electrolyte aqueous solution being contained within the chamber.

The evaporator region may be located partially in the common water collection manifold.

The condenser region may be cooled by a heat exchanger.

The present invention also provides a fuel cell comprising an anode chamber, a cathode chamber, means to
} supply a fuel gas to the anode chamber, means to supply an oxidant gas to the cathode chamber, the anode chamber having an anode electrode, the cathode chamber having a cathode electrode, an electrolyte located between the anode electrode and the cathode electrode, a third water collection chamber, and a hollow member positioned partially in the cathode chamber and partially in the third water collection chamber, the hollow member containing a non electrolyte aqueous solution, the walls of the hollow member being formed from a semi-permeable membrane which allows water to permeate therethrough but which prevents the permeation of the solute of the non electrolyte aqueous solution, the fuel gas or the oxidant gas therethrough, whereby, in operation, water produced or collected in the cathode chamber permeates through the wall of the hollow member into the hollow member by osmosis such that the pressure of water in the hollow member is greater than the pressure of water in the third water collecting chamber, to cause water in the hollow member to permeate through the wall of the hollow member into the third water collecting chamber.

The present invention also provides a fuel cell comprising an anode chamber, a cathode chamber, means to supply a fuel gas to the anode chamber, means to supply an oxidant gas to the cathode chamber, the anode chamber having an anode electrode, the cathode chamber having a cathode electrode, an electrolyte located between the anode electrode and the cathode electrode, a third water collection chamber, and a hollow member positioned partially in the anode chamber and partially in the third water collection chamber, the hollow member containing a non electrolyte aqueous solution, the wall of the hollow member being formed from a semi-permeable membrane which allows water to permeate therethrough but which prevents the permeation of the solute of the non electrolyte aqueous solution, the fuel gas and the oxidant gas therethrough whereby, in operation, water in the third water collection chamber permeates through the wall of the hollow member into the hollow member by osmosis such that water in the hollow member permeates through the wall of the hollow member into the anode chamber by osmosis.

The present invention also provides a fuel cell stack comprising at least one fuel cell, a heat pipe contacting the fuel cell to cool the fuel cell, the heat pipe having an evaporator region and a condenser region, the heat pipe comprising a hollow member, the hollow member having a wick and a semi-permeable membrane, the wick being arranged within the hollow member and being arranged to contact the inner surface of the hollow member, the wick being located within the evaporator region of the heat pipe and extending continuously along the inner surface of the hollow member from the evaporator region up to but excluding the condenser region of the heat pipe, the semi-permeable membrane being arranged within the hollow member and being spaced from the inner surface of the hollow member, the semi-permeable membrane being located within the condenser region of the heat pipe and being secured to the wick, the wick and the semi-permeable membrane defining a chamber with the inner surface of the hollow member, a non electrolyte aqueous solution being contained within the chamber.

The present invention further provides a heat pipe having an evaporator region and a condenser region, the heat pipe comprising a hollow member, the hollow member having a wick and a semi-permeable membrane, the wick being arranged within the hollow member and being arranged to contact the inner surface of the hollow member, the wick being located within the evaporator region of the heat pipe and extending continuously along the inner surface of the hollow member from the evaporator region up to but excluding the condenser region of the heat pipe, the semi-permeable membrane being arranged within the hollow member and being spaced from the inner surface of the hollow member, the semi-permeable membrane being located within the condenser region of the heat pipe and being secured to the wick, the wick and the semi-permeable membrane defining a chamber with the inner surface of the hollow member, a non electrolyte aqueous solution being contained within the chamber.

BRIEF DESCRIPTION OF THE DRAWINGS

The present invention will be more fully described by way of example, with reference to the accompanying drawings, in which:

FIG. 4 is an enlarged longitudinal sectional view through one of the heat management systems for the fuel cell stack shown in FIG. 1.

FIG. 5 is a sectional view in the direction of arrows B—B in FIG. 4.

DETAILED DESCRIPTION OF THE DRAWINGS

Figure 1:
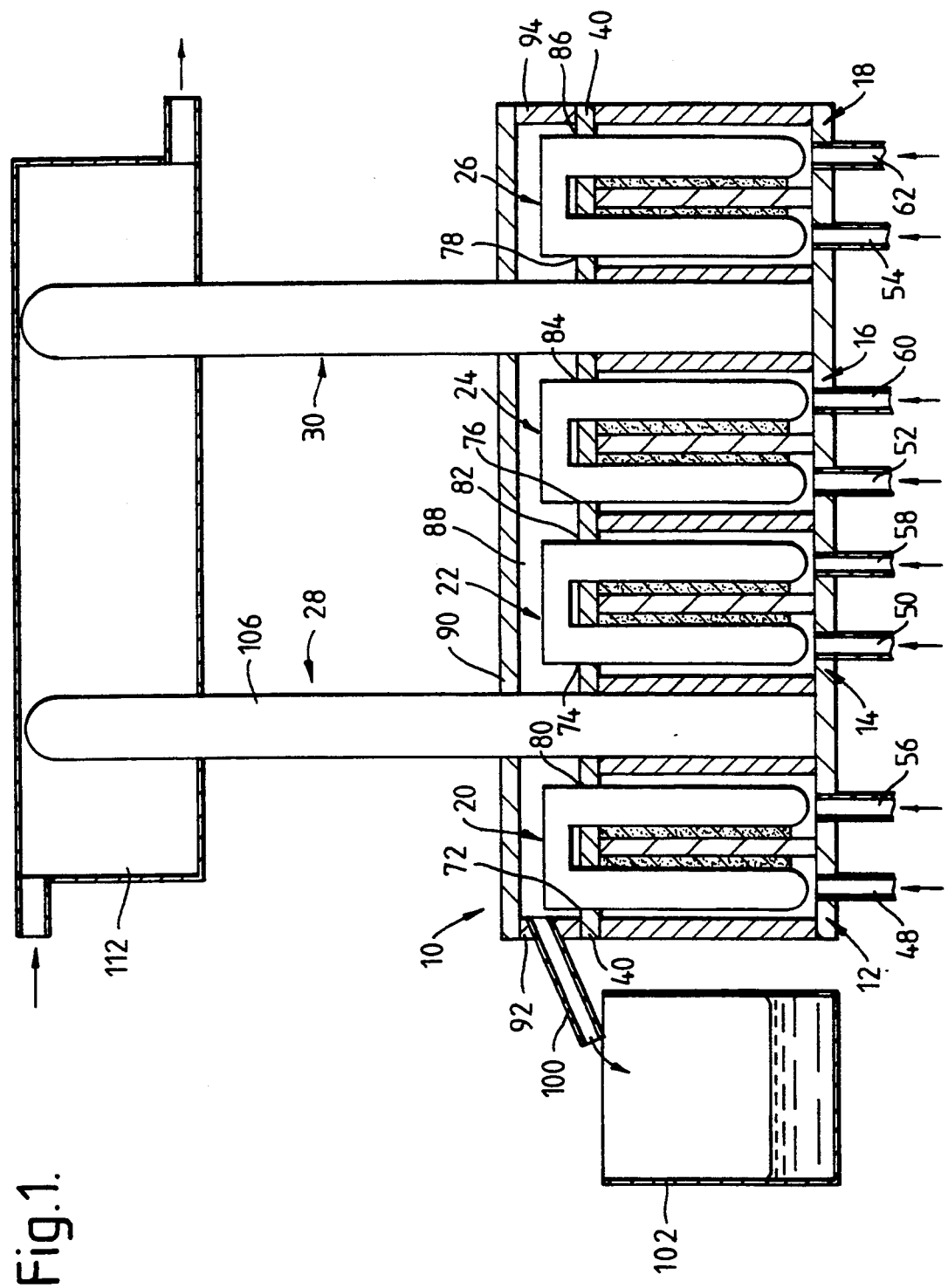
FIG. 1 is a longitudinal sectional view through a fuel cell stack having a plurality of fuel cells according to the present invention.

A fuel cell stack 10, shown in FIG. 1, comprises a plurality of fuel cells 12,14,16 and 18 each of which has a respective water management system 20,22,24 and 26. The fuel cell stack 10 also comprises a number of heat management systems 28 and 30.

Figure 2:
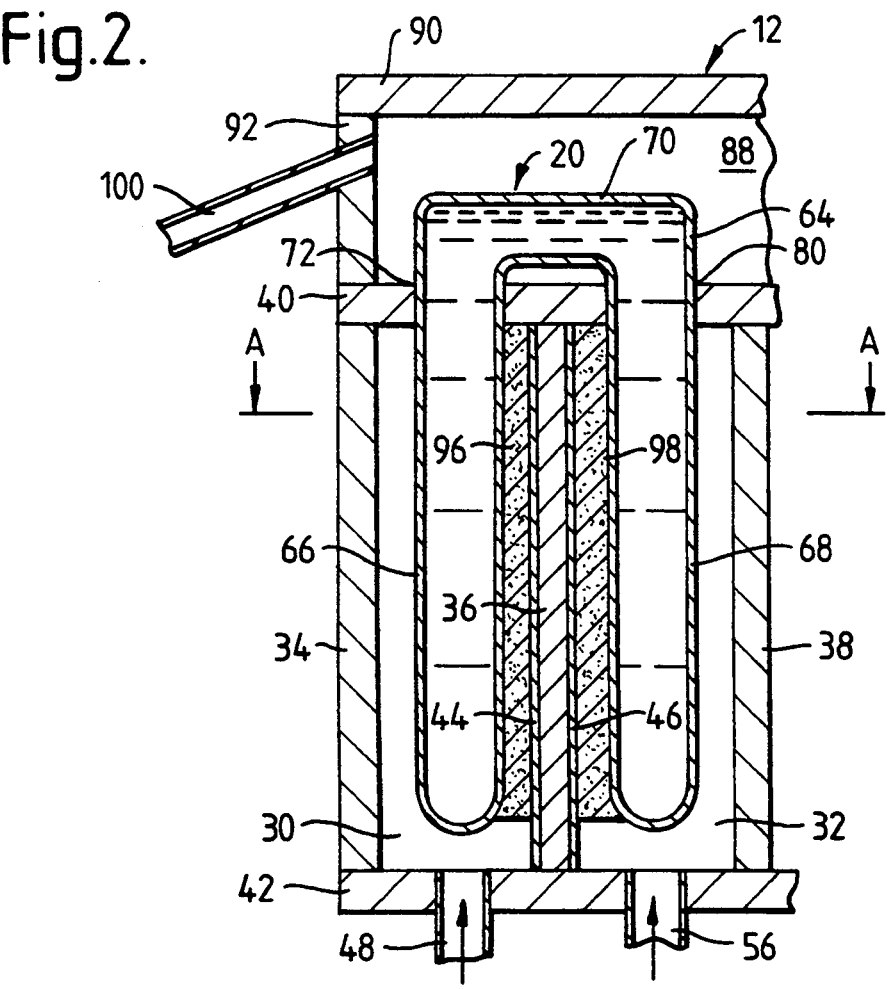
FIG. 2 is an enlarged longitudinal sectional view through one of the fuel cells shown in FIG. 1.
Figure 3:
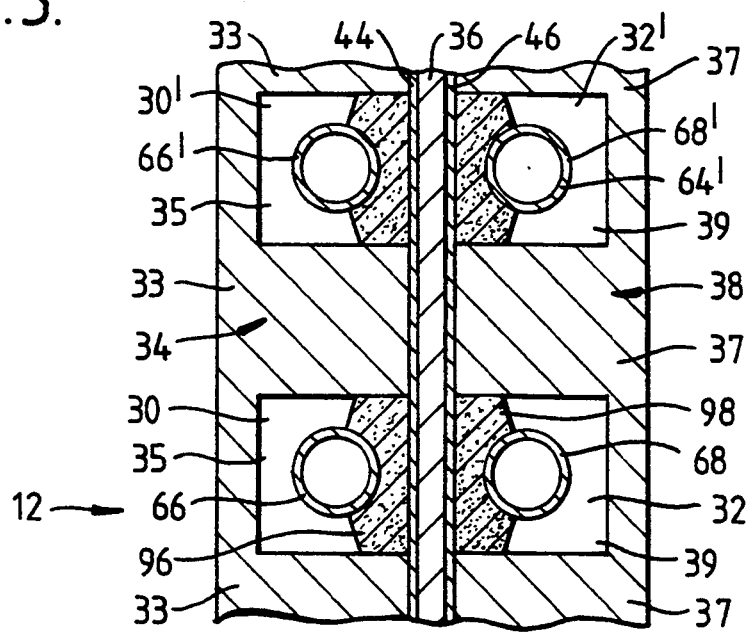
FIG. 3 is a sectional view in the direction of arrows A—A in FIG. 2.

One of the fuel cells 12, and its associated water management system 20, of the fuel cell stack 10 is shown in more detail in FIGS. 2 and 3. The fuel cell 12 comprises anode chambers 30 and 30' and cathode chambers 32 and 32'. The fuel cell 12 is defined between a first ribbed plate 34, a solid polymer electrolyte 36, a second ribbed plate 38 and end plates 40 and 42. The anode chambers 30 and 30' are defined by the first ribbed plate 34, the solid polymer electrolyte 36 and the end plates 40 and 42. The cathode chambers 32 and 32' are defined between the second ribbed plate 38, the solid polymer electrolyte 36 and the end plates 40 and 42. The first ribbed plate 34 has projections 33 and grooves 35, the projections 33 contact the solid polymer electrolyte 36 and thus the grooves 35 effectively form the anode chambers 30 and 30' of the fuel cell 12. The second ribbed plate 38 has projections 37 and grooves 39, the projections 37 contact the solid polymer electrolyte 36 and thus the grooves 39 effectively form the cathode chambers 32 and 32' of the fuel cell 12. The solid polymer electrolyte 36 has a porous anode electrode 44 on its surface defining a portion of each of the anode chambers 30 and 30'. Similarly the solid polymer electrolyte 36 has a porous cathode electrode 46 on its surface defining a portion of each of the cathode chambers 32 and 32'.

The end plate 42 has a plurality of ports 48,50,52 and 54 which are arranged to supply a fuel gas, typically hydrogen, from a source of fuel gas into the anode chambers 30, and 30' of the fuel cell 12 and the anode chambers of the fuel cells 14,16 and 18 respectively. The end plate 40 also has a plurality of ports 56,58,60 and 62 which are arranged to supply an oxidant gas, typically oxygen, from a source of oxidant gas into the cathode chambers 32 and 32' of the fuel cell 12 and the cathode chambers of the fuel cells 14,16 and 18 respectively.

The water management system 20 for the fuel cell 12 comprises a plurality of hollow members 64 and 64'. The hollow members 64 and 64' have first limbs 66 and 66' respectively which are positioned partially within the anode chambers 30 and 30' respectively, second limbs 68 and 68' respectively which are positioned partially within the cathode chambers 32 and 32' and interconnecting members 70 which fluidly interconnect the first limbs 66, 66' with the second limbs 68 68'.

The end plate 40 has apertures 72 through which the first limbs 66,66' of the hollow members 64,64' of the water management system 20 for the fuel cell 12 pass. The end plate 40 also has apertures 80 through which the second limbs 68,68' of the hollow members 64,64' of the water management system 20 for the fuel cell 12 pass. Similarly the end plate 40 has a plurality of apertures 74,76 and 78 through which the first limbs of the hollow members of the water management systems 22,24 and 26 for the fuel cells 14,16 and 18 pass, and a plurality of apertures 82,84 and 86 through which the second limbs of the hollow members of the water management systems 22,24 and 26 for the fuel cells 14,16 and 18 pass.

A water collecting manifold 88 is defined between the end plate 40, a plate 90 parallel to end plate 40 and side plates 92 and 94. The water collecting manifold 88 has a discharge pipe 100 at a suitable elevation in the side plate 92 to discharge excess water from the manifold 88 to a water store 102.

A portion of the first limbs 66,66', a portion of the second limbs 68,68' and the interconnecting members 70 of the hollow members 64,64' are positioned in the water collecting manifold 88.

The hollow members 64,64' contain a non-electrolyte aqueous solution 104. The non-electrolyte aqueous liquid may be water, a sucrose solution or other suitable solution. The walls of hollow members 64,64' are formed from a semi-permeable membrane, which allows water to permeate therethrough, but which prevent the solute of the non-electrolyte aqueous solution, fuel gas and oxidant gas permeating therethrough.

The portion of the first limbs 66,66' within the first anode chambers 30,30' of the hollow members 64,64' are covered by a capillary wick 96. The capillary wick 96 is arranged in contact with the porous anode electrode 44. Similarly the portion of the second limbs 68,68' within the second cathode chambers 32,32' of the hollow members 64,64' are covered by a capillary wick 98. The capillary wick 98 is arranged in contact with the cathode electrode 46. The capillary wicks 96 and 98 comprise porous graphite or other suitable materials.

The first limbs 66,66' and the second limbs 68,68' of the hollow member 64,64' respectively seal with the end plate 40 to prevent mixing of any water in the water collecting manifold 88 with reactants in the anode chambers 30,30' and the cathode chambers 32,32'.

During operation of the fuel cell 12 water is transported from the anode electrode 44 to the cathode electrode 46 through the porous solid polymer electrolyte 36 by the action of the positive ions, in this example hydrogen ions, passing through the solid polymer electrolyte 36 from the anode 44 to the cathode 46. Also water is produced by the reaction of the positive ions, in this case hydrogen ions, with the oxidant gas, in this example oxygen.

As discussed previously, water collecting on the surface of the cathode electrode prevents the oxidant gas, the oxygen, contacting the cathode electrode and the anode electrode becomes dry due to transportation of water from the anode to the cathode.

In the present invention, water transported to the cathode electrodes 46 or water produced at the cathode electrode 46 is arranged to pass through the semipermeable membrane of the second limb 68 of the hollow member 64 into the non electrolyte aqueous solution 104. The water in the cathode chamber 30 tends to pass through the semi-permeable membrane of the second limb 68, by osmosis, if the fugacity of the water in the non electrolyte aqueous solution is less than the fugacity of the water in the cathode chamber 32. The passage of water from the cathode chamber 32 into the non electrolyte aqueous solution 104 within the hollow member 64 tends to raise the pressure of the non electrolyte aqueous solution 104.

If the water pressure in the water collecting manifold 88 is less than the pressure on the non electrolyte aqueous solution 104 in the hollow member 64 by an amount greater than the osmotic pressure, water is discharged from the hollow member 64 into the water collecting manifold 88. The pressure of water in the cathode chamber 32 is arranged to be greater than the pressure in the water collecting manifold 88 by a predetermined value such that water is discharged from the hollow member 64 into the water collecting manifold 88.

The discharge rate of water from the water collecting manifold 88 to the water store 102 may be controlled by measuring the pressure difference between the pressure in the non electrolyte aqueous solution in the hollow member 64 and the pressure in the water collecting manifold 88, and comparing the said pressure difference with the osmotic pressure. The discharge rate is controlled by maintaining the comparison between the said pressure difference and the osmotic pressure within a predetermined range of values.

The water in the anode chamber 30 or cathode chamber 32 tends to pass through the semi permeable membrane of the hollow member 64, by osmosis, if the fugacity of the water in the non electrolyte aqueous solution is less than the fugacity of the water in the reactant gases, hydrogen and oxygen, in the anode or cathode chambers 30 and 32 respectively. Similarly the water in the non electrolyte aqueous solution tends to pass through the semi-permeable membrane of the hollow member 64, by reverse osmosis, if the fugacity of the water in the reactant gases in the anode or cathode chambers 30 and 32 respectively is less than the fugacity of the water in the non electrolyte aqueous solution.

Thus there is a tendency for water transported to the cathode electrodes 46 or water produced at the cathode electrodes 46 to pass from the cathode chamber 32 through the semi-permeable membrane of the hollow member 64, by osmosis, into the non electrolyte aqueous solution within the hollow member 64. There is also a tendency for water in the non electrolyte aqueous solution within the hollow member 64 to pass through the semi-permeable membrane of the hollow member 64, by reverse osmosis, into the dryer, lower water fugacity anode chamber 30. There is a further tendency for water in the non electrolyte aqueous solution within the hollow member 64 to pass through the semi-permeable of the hollow member 64, by reverse osmosis, into dryer, lower water fugacity, regions of the cathode chamber 32.

The fugacity of the water in the cathode chamber 32 depends on the pressure and mole fraction of water in the cathode chamber 32. Increasing the pressure or mole fraction of water increases the fugacity of the water in the cathode chamber 32. The capillary wick 98 around the semi-permeable membrane of the second limb 68 of the hollow member 64 within cathode chamber 32 is arranged to keep the semi permeable membrane surrounded by pure water, rather than a mixture of water and oxidant gas. The pressure on the water in contact with the semi-permeable membrane is the total pressure, rather than the partial pressure of the vapour in the vapour, oxidant mixture, less the capillary pressure term. This maximises the fugacity of the water in contact with the semi-permeable membrane, and hence maximises the tendency of the semi-permeable membrane to absorb this water. The capillary wick 98 lies in contact with the porous cathode electrode 46 to effect a contiguous capillary medium from the source of the water production in the cathode electrode 46 to the semi-permeable membrane of the hollow member 64.

With the bulk of the transported water and product water within the cathode chamber 32 being removed by the capillary wick and the hollow member 64, the free volume within the cathode chamber 32 is available for the oxidant gas to flow to the cathode electrode 46 relatively unimpeded by water. This may obviate the need for a flow of oxidant gas through the cathode chamber 46, and recirculating flow of oxidant gas.

The semi-permeable membrane of the first limb 66 of the hollow member 64 in the anode chamber 30 may or may not be covered with a capillary wick 96. An advantage of a capillary wick 96 in contact with the porous anode electrode 44 is that it provides a contiguous capillary medium flow path for water from the hollow member 64 to the anode electrode 44. A disadvantage of a capillary wick 96 in contact with the porous anode electrode 44 is that water surrounding the hollow member 64 increases the fugacity of water in contact with the hollow member 64. This would reduce the rate of water diffusion through the semi-permeable membrane into the anode chamber 30.

The oxidant gas fed to the cathode chamber 32 tends to absorb water vapour from the external surface of the capillary wick 98, until an equilibrium prevails between the partial pressure of vapour in the oxidant gas and the pressure at the surface of the capillary wick 98. The equilibrium is the saturation pressure of water at the prevailing temperature. The oxidant gas therefore becomes saturated with vapour automatically.

The fuel gas fed to the anode chamber also tends to absorb water vapour from the semi-permeable membrane and becomes saturated with vapour automatically, either with or without a capillary wick 96. The proton transport mechanism in the fuel cell membrane carries several molecules of water per proton. This movement of water from the anode electrode to the cathode electrode causes the anode fuel gas to dry out and the cathode oxidant gas to saturate. The invention collects water from the cathode chamber and returns it to the anode chamber to compensate for this tendency.

Each of the other fuel cells 14,16 and 18 are constructed in the same manner as the fuel cell 12 already described. All the fuel cells effectively share the single water collecting manifold 88.

One of the heat management systems 28, of the fuel cell stack 10 is shown in more detail in FIG. 4. The heat management system 28 comprises one or more heat pipes 106. The heat pipe 106 has an evaporator region 108 and a condenser region 110. The evaporator region 108 of the heat pipe 106 is located within the fuel cell stack 10. The condenser region 110 of the heat pipe 110 is located within a heat exchanger 112.

The heat pipe 106 comprises a hollow member 114. The hollow member 114 has a capillary wick 116 contacting its inner surface, and the capillary wick 116 is located within the hollow member 114 in the evaporator region 108. The capillary wick 116 extends continuously along the inner surface of the hollow member 114 from the evaporator region 108 up to but excluding the inner surface of the hollow member 114 in the condenser region 110. A semi-permeable membrane 118 is arranged within the hollow member 114 in the condenser region 110. The semi-permeable membrane 118 is spaced from the inner surface of the hollow member 114. The semi-permeable membrane 118 is secured to the capillary wick 116, and the semi-permeable membrane 118 and the capillary wick 116 define an annular chamber 120 with the inner surface of the hollow member 114. A non electrolyte aqueous solution is contained within the annular chamber 120. The non electrolyte aqueous solution may be water a sucrose, or other suitable, solution.

In the evaporator region 108 of the heat pipe 106 the hollow member 114 contacts the plates 38 and 108 of the adjacent rows of fuel cells 12 and 14, and the evaporator region 108 of the heat pipe 106 passes through the water collecting manifold 88. The plates 38 and 108 of the rows of fuel cells 12 and 14 are coated with a suitable material to conduct heat to the hollow member 114. The evaporator region 108 of the hollow member 114 may alternatively be formed integral with the plates 38 and 108 of the adjacent rows of fuel cells 12 and 14. The hollow member 114 and the capillary wick 116 are formed from a suitable material for use with a water and sucrose solution.

In operation, water vapour is evaporated from the non electrolyte aqueous solution in the evaporator region 108 of the heat pipe 106 and water vapour is condensed in the condenser region 110 of the heat pipe 106. During operation, the water vapour in the heat pipe 106 is at saturation conditions. The liquid in the capillary wick 116 in the evaporator region 108 of the heat pipe 106 is at a lower pressure than the saturation pressure in the water vapour, because of the capillary term $2\Sigma/R$, where $\Sigma$ = surface tension and R = radius of curvature of the vapour/liquid interface in the capillaries of the capillary wick 116. Water vapour is produced in the evaporator region 108 with an attendant cooling of the liquid in the capillary wick 116. Since only water is evaporated, the water concentration in solution in the capillary wick 116 in the evaporator region 108 is reduced, and with it its fugacity. The water vapour travels to the condenser region 110 where it gives up its latent heat to the heat exchanger 112. The pure water formed by condensation collects on the semi-permeable membrane 118, and is absorbed through the semi-permeable membrane 118 into the non electrolyte aqueous solution within the annular chamber 120. This causes the water concentration and fugacity in solution in the annular chamber 120 in the condenser region 110 to increase. The resulting difference in water concentration and fugacity between the solution in the annular chamber 120 in the condenser region 110 and the capillary wick 116 in the evaporator region 108 causes water to flow through the solution from the condenser region 110 to the evaporator region 108.

Thus there are three pumping mechanisms in the heat pipe 106, the osmotic pressure across the semi-permeable membrane 118, the water concentration gradient between the condenser region 110 and the evaporator region 108, and the reduction in liquid pressure in the evaporator region 108 due to surface tension effects in the capillary wick 116.

The osmotic pumping mechanism due to the osmotic pressure across the semi-permeable membrane 118 is expected to increase the fluid return head compared to the pumping mechanism due to the reduction in liquid pressure in the evaporator region due to surface tension effects in the capillary wick. This enables the proportion of heat pipe area allocated to vapour transport to be increased. Also fewer heat pipes according to the present invention are required per fuel cell stack compared to those without the osmotic pumping mechanism resulting in a weight saving.

Each of the heat management systems 28,30 serves to cool a number of fuel cells. The radial heat flux capability of the heat management systems 28 and 30 are greater than the heat flux evolved in a single fuel cell. A number of heat pipes 106 and 106' are arranged side by side between the plates 38 and 108, and adjacent heat pipes 106 and 106' are separated by a common wall which is parallel to the axes of the heat pipes. These common walls provide compressive strength to the fuel cell stack and serve as electron current pathways for the series connected fuel cells of the fuel cell stack 10.

I claim:

1. A fuel cell comprising an anode chamber, a cathode chamber, means to supply a fuel gas to the anode chamber, means to supply an oxidant gas to the cathode chamber, the anode chamber having an anode electrode, the cathode chamber having a cathode electrode, an electrolyte located between the anode electrode and the cathode electrode, and a hollow member positioned partially in the anode chamber and partially in the cathode chamber, the hollow member containing a non electrolyte aqueous solution, the walls of the hollow member comprising a semi-permeable membrane which allows water to permeate therethrough but which prevents the permeation of the solute of the non-electrolyte aqueous solution, the fuel gas or the oxidant gas therethrough, whereby, in operation, water produced or collected in the cathode chamber permeates through the wall of the hollow member into the hollow member by osmosis such that water in the hollow member permeates through the wall of the hollow member into the anode chamber by osmosis.

2. A fuel cell as claimed in claim 1 in which a portion of the hollow member is positioned within a third chamber, the pressure of water in the hollow member being greater than the pressure of water in the third chamber whereby, in operation, water in the hollow member permeates through the walls of the hollow member into the third chamber.

3. A fuel cell as claimed in claim 2 in which the hollow member comprises a first limb, a second limb and an interconnecting member which fluidly connects the first and second limbs, the first limb is positioned at least partially in the anode chamber, the limb is positioned at least partially in the cathode chamber, and the interconnecting member is positioned in the third chamber.

4. A fuel cell as claimed in claim 1 in which the electrolyte is a solid polymer electrolyte.

5. A fuel cell as claimed in claim 1 in which the wall of the second limb of the hollow member is enclosed by a capillary wick, the capillary wick being arranged in contact with the cathode electrode.

6. A fuel cell as claimed in claim 1 in which the wall of the first limb of the hollow member is enclosed by a capillary wick, the capillary wick being arranged in contact with the anode electrode.

7. A fuel cell as claimed in claim 3 in which the third chamber is arranged to supply water produced in the second cathode chamber to a water store.

8. A fuel cell as claimed in claim 1 in which the non-electrolyte aqueous solution is a water-sucrose solution.

9. A fuel cell as claimed in claim 1 in which the means to supply a fuel gas is arranged to supply hydrogen.

10. A fuel cell as claimed in claim 1 in which the means to supply an oxidant gas is arranged to supply oxygen.

11. A fuel cell stack comprising a plurality of fuel cells as claimed in claim 1.

12. A fuel cell stack comprising a plurality of fuel cells as claimed in claim 2 in which the third chambers of the fuel cell are interconnected to form a common water manifold.

13. A fuel cell stack as claimed in claim 12 in which the common water manifold is arranged to supply water produced in the second cathode chambers to a common water store.

14. A fuel cell stack as claimed in claim 11 in which a heat pipe is arranged to contact at least one of the fuel cells to cool the fuel cell, the heat pipe having an evaporator region and a condenser region, the heat pipe comprising a hollow member, the hollow member having a wick and a semi-permeable membrane, the wick being arranged within the hollow member and being arranged to contact the inner surface of the hollow member, the wick being located within the evaporator region of the heat pipe and extending continuously along the inner surface of the hollow member from the evaporator region up to but excluding the condenser region of the heat pipe, the semi-permeable membrane being arranged within the hollow member and being spaced from the inner surface of the hollow member, the semi-permeable membrane being located within the condenser region of the heat pipe and being secured to the wick, the wick and the semi-permeable membrane defining a chamber with the inner surface of the hollow member, a non electrolyte aqueous solution being contained within the chamber.

15. A fuel cell stack as claimed in claim 14 in which the evaporator region is located partially in the common water collection manifold.

16. A fuel cell stack as claimed in claim 15 in which the condenser region is cooled by a heat exchanger.

17. A fuel cell comprising an anode chamber, a cathode chamber, means to supply a fuel gas to the anode chamber, means to supply an oxidant gas to the cathode chamber, the anode chamber having an anode electrode, the cathode chamber having a cathode electrode, an electrolyte located between the anode electrode and the cathode electrode, a third water collection chamber, and a hollow member being positioned partially in the cathode chamber and partially in the third water collection chamber, the hollow member containing a non electrolyte aqueous solution, the walls of the hollow member comprising a semi-permeable membrane which allows water to permeate therethrough but which prevents the permeation of the solute of the non electrolyte aqueous solution, the fuel gas or the oxidant gas therethrough, whereby, in operation, water produced or collected in the cathode chamber permeates through the wall of the hollow member into the hollow member by osmosis such that the pressure of water in the hollow member is greater than the pressure of water in the third water collecting chamber, to cause water in the hollow member to permeate through the wall of the hollow member into the third water collecting chamber.

18. A fuel cell comprising an anode chamber, a cathode chamber, means to supply a fuel gas to the anode chamber, means to supply an oxidant gas to the cathode chamber, the anode chamber having an anode electrode, the cathode chamber having a cathode electrode, an electrolyte located between the anode electrode and the cathode electrode, a third water collection chamber, and a hollow member positioned partially in the anode chamber and partially in the third water collection chamber, the hollow member containing a non electrolyte aqueous solution, the wall of the hollow member comprising a semi-permeable membrane which allows water to permeate therethrough but which prevents the permeation of the solute of the non electrolyte aqueous solution, the fuel gas and the oxidant gas therethrough whereby, in operation, water in the third water collection chamber permeates through the wall of the hollow member into the hollow member by osmosis such that water in the hollow member permeates through the wall of the hollow member into the anode chamber by osmosis.

19. A fuel cell stack comprising at least one fuel cell, a heat pipe contacting the fuel cell to cool the fuel cell, the heat pipe having an evaporator region and a condenser region, the heat pipe comprising a hollow member, the hollow member having a wick and a semi-permeable membrane, the wick being arranged within the hollow member and being arranged to contact the inner surface of the hollow member, the wick being located within the evaporator region of the heat pipe and extending continuously along the inner surface of the hollow member from the evaporator region up to but excluding the condenser region of the heat pipe, the semi-permeable membrane being arranged within the hollow member and being spaced from the inner surface of the hollow member, the semi-permeable membrane being located within the condenser region of the heat pipe and being secured to the wick, the wick and the semi-permeable membrane defining a chamber with the inner surface of the hollow member, a non electrolyte aqueous solution being contained within the chamber.

20. A heat pipe having an evaporator region and a condenser region, the heat pipe comprising a hollow member, the hollow member having a wick and a semi-permeable membrane, the wick being arranged within the hollow member and being arranged to contact the inner surface of the hollow member, the wick being located within the evaporator region of the heat pipe and extending continuously along the inner surface of the hollow member from the evaporator region up to but excluding the condenser region of the heat pipe, the semi-permeable membrane being arranged within the hollow member and being spaced from the inner surface of the hollow member, the semipermeable membrane being located within the condenser region of the heat pipe and being secured to the wick, the wick and the semi-permeable membrane defining a chamber with the inner surface of the hollow member, a non electrolyte aqueous solution being contained within the chamber.

21. A fuel cell comprising an anode chamber, a cathode chamber, means to supply a fuel gas to the anode chamber, means to supply an oxidant gas to the cathode chamber, the cathode chamber having a cathode electrode, the anode chamber having an anode electrode, an electrolyte located between the anode electrode and the cathode electrode, and a hollow member positioned in the anode chamber, the hollow member containing a non electrolyte aqueous solution, the wall of the hollow member comprising a semi-permeable membrane which allows water to permeate therethrough but which prevents the permeation of the solute of the non electrolyte aqueous solution, the fuel gas and the oxidant gas therethrough whereby, in operation, water in the hollow member permeates through the wall of the hollow member into the anode chamber by osmosis.

22. A fuel cell comprising an anode chamber, a cathode chamber, means to supply a fuel gas to the anode chamber, means to supply an oxidant gas to the cathode chamber, the cathode chamber having a cathode electrode, the anode chamber having an anode electrode, an electrolyte located between the anode electrode and the cathode electrode, and a hollow member positioned in the cathode chamber, the hollow member containing a non electrolyte aqueous solution, the wall of the hollow member comprising a semi-permeable membrane which allows water to permeate therethrough but which prevents the permeation of the solute of the non electrolyte aqueous solution, the fuel gas and the oxidant gas therethrough whereby, in operation, water produced or collected in the cathode chamber permeates through the wall of the hollow member into the hollow member by osmosis.

\* \* \* \* \*